(12) United States Patent
Gudgeon

(10) Patent No.: US 7,349,446 B2
(45) Date of Patent: Mar. 25, 2008

(54) SIGNAL SUPERIMPOSITION

(75) Inventor: Peter Charles Gudgeon, Hertfordshire (GB)

(73) Assignee: Goodrich Control Systems Limited, Bedfordshire (GB)

( * ) Notice: Subject to any disclaimer, the term of this patent is extended or adjusted under 35 U.S.C. 154(b) by 981 days.

(21) Appl. No.: 10/389,755

(22) Filed: Mar. 18, 2003

(65) Prior Publication Data

US 2003/0179764 A1 Sep. 25, 2003

(30) Foreign Application Priority Data

Mar. 20, 2002 (GB) ................................. 0206618.1

(51) Int. Cl.
*H04J 3/00* (2006.01)

(52) U.S. Cl. ...................... 370/529; 370/503; 370/514; 455/260; 307/64; 307/73

(58) Field of Classification Search .................... None
See application file for complete search history.

(56) References Cited

U.S. PATENT DOCUMENTS

| 4,855,735 A | * | 8/1989 | Webb et al. ........... 340/870.14 |
| 5,729,059 A | * | 3/1998 | Kilroy et al. ................. 307/84 |
| 5,844,329 A | * | 12/1998 | Bailey et al. ................. 307/66 |
| 5,878,335 A | | 3/1999 | Kushner |

* cited by examiner

*Primary Examiner*—Duc Ho
(74) *Attorney, Agent, or Firm*—Banner & Witcoff, Ltd.

(57) ABSTRACT

A method and apparatus are provided in which control data for a generator system is multiplexed onto a synchronization signal.

18 Claims, 3 Drawing Sheets

SIGNAL SUPERIMPOSITION

FIELD OF THE INVENTION

The present invention relates to a method of transmitting two signals over a single transmission line, and in particular to a method of transmitting a frequency reference signal and a control command signal for a generator command unit over a single transmission line, and to an apparatus utilising such a method.

BACKGROUND TO THE INVENTION

As electronic equipment and/or systems controlled by such equipment become ever more complex so the number of signals required to be transmitted between individual pieces of equipment and/or subsystems increases. There is therefore a corresponding increase in the number of transmission lines, or cables, that are required to be provided between individual items of equipment. In certain applications where physical space is limited, or where it is desirable to minimise the weight of physical transmission lines, or where new systems are being retrofitted into existing installations it becomes impracticable or impossible to provide a wire for each individual signal.

One such area where this conflict arises is on aircraft. Most aircraft have a number of onboard electrical generators that are driven by the aircraft engines to supply the power for the aircraft's electronic and electrical systems. Generally, each generator is controlled by an associated electronic generator control unit (GCU) that ensures the power supply provided by the generator is within certain predetermined parameters e.g. frequency and voltage, that are appropriate for the electrical equipment to be supplied. However, there is clearly a requirement to provide a power supply to the aircraft electrical systems when the aircraft is on the ground and the engines are not in operation or are in a start up or shut down mode. For example, it is often desirable to operate the air conditioning units and lighting on the aircraft when it is on the ground to allow simple maintenance and cleaning operations to be completed, or equally to enable the various flight systems to be operated, such as navigation computers, prior to the departure of the aircraft. It is therefore necessary to provide an auxiliary power supply. The auxiliary power supply may either be a portable generator, for example a diesel powered generator, that is connected to the aircraft's electrical system, or may be an auxiliary power unit mounted on the aircraft itself.

In either case, when switching between the aircraft's power supply and the auxiliary power supply it is undesirable to have any interruption in the power supply to the electrical systems. The seamless switch from one power supply to another is referred to as a "no break power transfer" (NBPT) and it is accomplished by very briefly having both power supplies connected to the aircraft systems at the same time.

Successfully providing NBPT requires careful synchronising of the auxiliary power supply and the aircraft generators to avoid any sudden unequal loading of the electrical systems. This is accomplished by providing a fixed frequency reference signal from a frequency reference unit to the aircraft's generator control units and also providing command signals that are transmitted between the auxiliary power supply control unit and the aircraft generator control units. The frequency reference signal and the command signals have in the past been provided over separate transmission lines or cables. It is not always practicable or possible to provide individual signal lines, especially where equipment is being retrofitted.

It is therefore desirable to provide a method of transmitting more than one signal using the same transmission line.

SUMMARY OF THE INVENTION

According to a first aspect of the present invention there is provided a method of transmitting data over a single transmission path, the method comprising the steps of providing a first signal, and modulating said first signal with a second signal, said second signal having a higher frequency content than said first signal.

Preferably the first signal comprises first periods of a first signal level separated by second periods of a second signal level different from the first signal level.

In a preferred embodiment there is provided a method of transmitting two signals over a single transmission path, the method comprising: providing a first signal comprising a series of pulses, each pulse having a first pulse duration and transmitting said first signal over the transmission path; and providing a second signal comprising a series of pulses, each pulse having a second pulse duration, the second pulse duration being less than the first pulse duration, and transmitting said second signal over the transmission line, whereby said second signal is transmitted within said first pulse duration.

The first signal may be a timing reference signal having a fixed frequency, such that the signal level alternates between the two signal levels. The second signal may be a data signal and may be transmitted only in between each transition of the first signal.

The second signal is preferably transmitted by imposing it on the first signal during the first periods thereof.

Preferably guard periods are provided either side of the second signal such that signal transitions belonging to the first signal can be distinguished from signal transitions belonging to the second signal.

The second signal may in fact be comprised of more than one signal, each part of the second signal being transmitted in between different transitions of the first signal.

The first signal may alternatively be a data signal provided that a second signal is not transmitted for a predetermined period of time spanning the end of one pulse of the first signal and the beginning of the consecutive pulse of the first signal such that the state of the first signal at the beginning of each pulse can always be determined.

The first signal may be a frequency reference signal for the synchronisation of a first and a second generator and the second signal may comprise control signals transmitted between respective control units of a first and second generator.

According to a second aspect of the present invention there is provided a generator control system comprising generator controllers responsive to a first signal path, wherein a first signal is transmitted on the signal path, and a second signal is transmitted on the signal path, the second signal modulating the first signal and having a higher frequency content than the first signal.

According to a third aspect of the present invention there is provided a controller for a generator, wherein the controller has a first signal connection and the controller is responsive to a synchronisation signal on the first signal connection and is responsive to command signals modulated onto the synchronisation signal and having a shorter interpulse period than the synchronisation signal.

BRIEF DESCRIPTION OF THE DRAWINGS

An embodiment of the present invention will further be described, by way of example, with reference to the accompanying drawings, in which.

DESCRIPTION OF PREFERRED EMBODIMENTS

Figure 1:
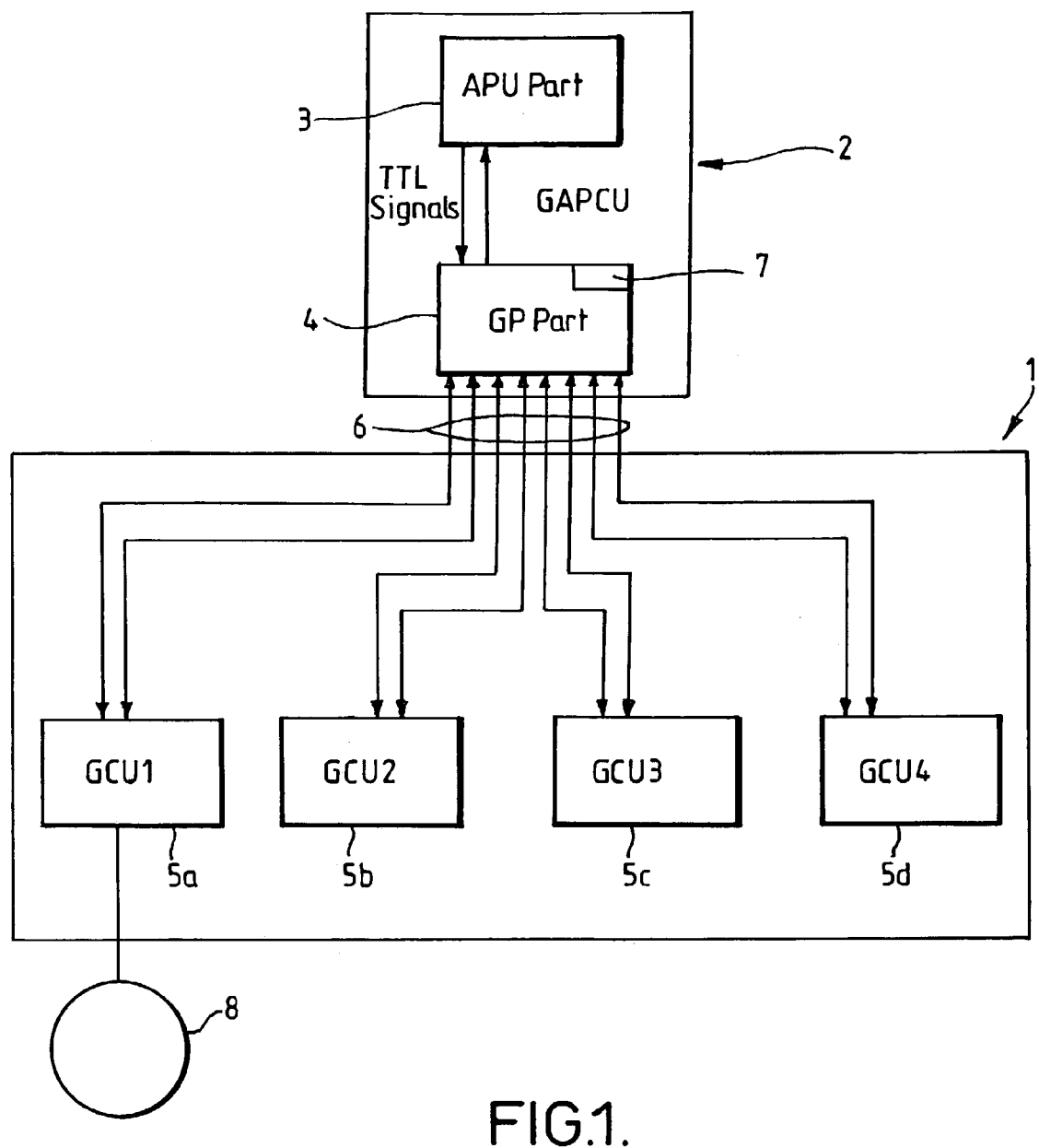
FIG. 1 is a schematic representation of an aircraft generator system and auxiliary power supply.

FIG. 1 is a schematic representation of an aircraft power supply 1 connected to a power control unit 2. The aircraft power supply 1 includes four generator control units 5a, 5b, 5c, 5d. Each generator control unit is connected to a respective electrical generator, although for the sake of clarity only one generator 8 is illustrated. It will be appreciated that the number of generators and generator control units will vary from aircraft to aircraft and the system shown in FIG. 1 is simply a representative example. Each generator control unit 5 controls the power output by its respective generator, in particular the frequency, phase and magnitude thereof. The power control unit 2 comprises an auxiliary power control unit 3 connected to an auxiliary generator (not shown) and/or a ground power control unit 4 connected to one or more external ground generator sources (not shown). The ground power control unit 4 is also connected to each of the generator control units 5a, 5b, 5c, 5d onboard the aircraft by means of a communications cable 6. The communication cable 6 may be a bi-directional RS485 data link, with a data transfer rate of 100 kb per second, although other suitable data links may be used.

The generator control units 5a-5d each receive a frequency reference signal. In general this signal is provided by a reference unit 7 which may be within the power control unit 2. This unit can also be used to supply a reference signal to the auxiliary power control unit 3. However, where the ground based power unit is provided to initiate aircraft operation, the control unit associated with the ground based generator may act as the master for the frequency reference signal. In such an arrangement the auxiliary power control unit 3 on the ground based generator must supply both the frequency reference signal to the individual generator control units 5a-5d and must also establish data communication with the controllers such that each controller can verify that the system is operating correctly and can be appraised of a fault condition if one arises.

Figure 2:
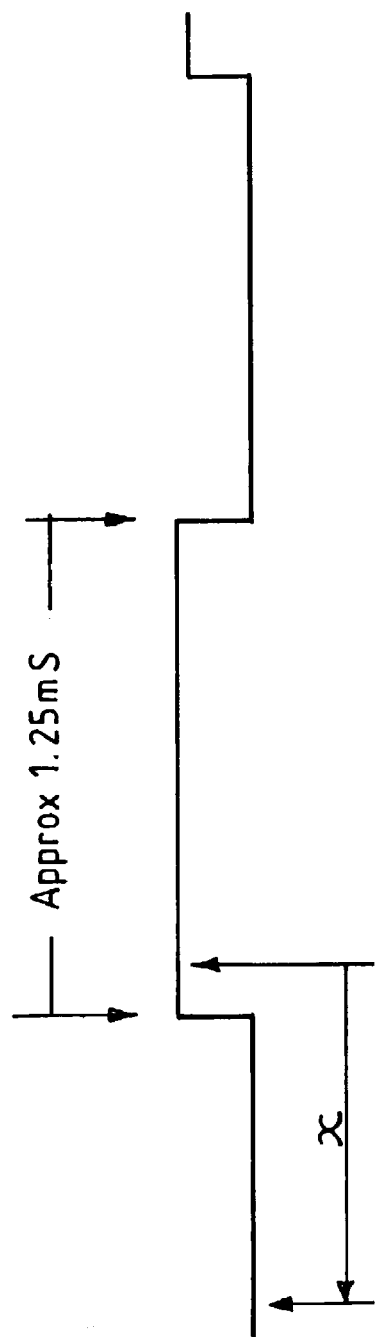
FIG. 2 represents a frequency reference signal using the power supply system of FIG. 1.

The frequency reference signal is a 400 Hz square wave signal, as shown in FIG. 2.

The 400 Hz square wave frequency reference signal shown in FIG. 2 provides the frequency reference signal for no break power transfer (NBPT) when the power supply is transferred between the generators onboard the aircraft and the auxiliary ground based generator of the power control unit 2. For synchronisation purposes it is only necessary to detect the leading edge of the frequency reference signal. To eliminate any spurious triggers due to noise on the signal, filtering of the signal is used by the ground power control unit 4 and the generator control units 5. By using filtering, the leading edge of the frequency reference signal can be identified by the signal being low for a certain length of time, followed by the signal going high and remaining high for a minimum length of time. This is indicated on FIG. 2 by the time interval marked X, which denotes the portion that identifies the frequency reference leading edge. It therefore follows that the remainder of the frequency reference signal when the signal is high conveys no further useful information.

To accomplish the synchronisation and the no-break power transfer between the onboard power supply 1 and the power control unit 2, the ground power control unit 4 and the generator control units 5 of the onboard power supply 1 exchange command signals. In the described embodiment of the present invention the protocol for the command signals comprises four word commands. The first word always has the same value and is denoted as purely a start word. The last word, again always has the same value and simply indicates the end of the message. The middle two words transfer the actual message information. Each transmitted word typically comprises 1 start bit, 8 data bits, 1 parity bit and 2 stop bits, giving a total of 12 bits per word. Therefore, the four word command message comprises 48 bits. If the command message is therefore transmitted at 40 Kb per second then each bit would have a duration of approximately 0.025 mS per bit. Thus, to transmit the four word, 48 bit, command message would require 1.2 mS. Referring back to FIG. 2, it can be seen that it is therefore possible to transmit the four word command message within each high phase (also known as a mark) of the frequency reference signal.

Figure 3:
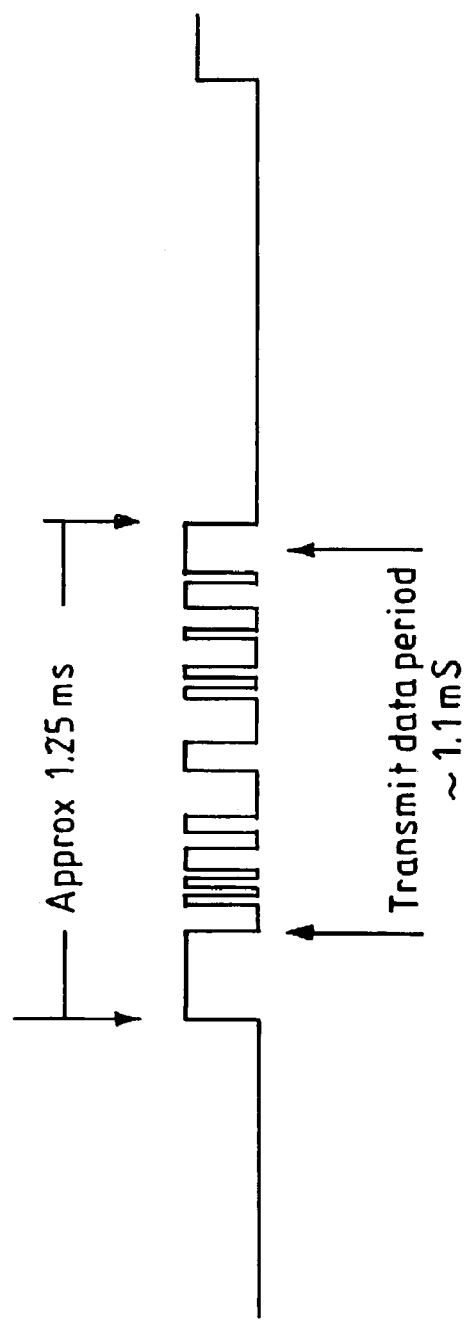
FIG. 3 shows a generator control unit command signal used in the power supply of FIG. 1 superimposed on the frequency reference signal of FIG. 2.

The combined frequency reference signal and command message signal is shown in FIG. 3. The frequency reference information can be obtained from the combined signal of FIG. 3 using the previously mentioned property that the leading edge is defined by the signal being low for a certain length of time followed by going high for a set period. Equally, the command message information can be extracted from the combined signal of FIG. 3 by sampling the signal at a suitable sampling rate, for example at 1 MHz. A sampling rate of 1 MHz would provide 24 samples for each data bit of the command message.

For a RS485 data link, the maximum data rate is 100 Kb per second. This equates to 0.010 mS per bit. Therefore each word of the command message would require 0.12 mS and the complete four word message would thus require 0.48 mS. Therefore there could be a maximum of two packets (of four words) in each high phase of the frequency reference signal.

Thus by combining the two signals a single transmission line can be used without any loss of information.

Figure 4:
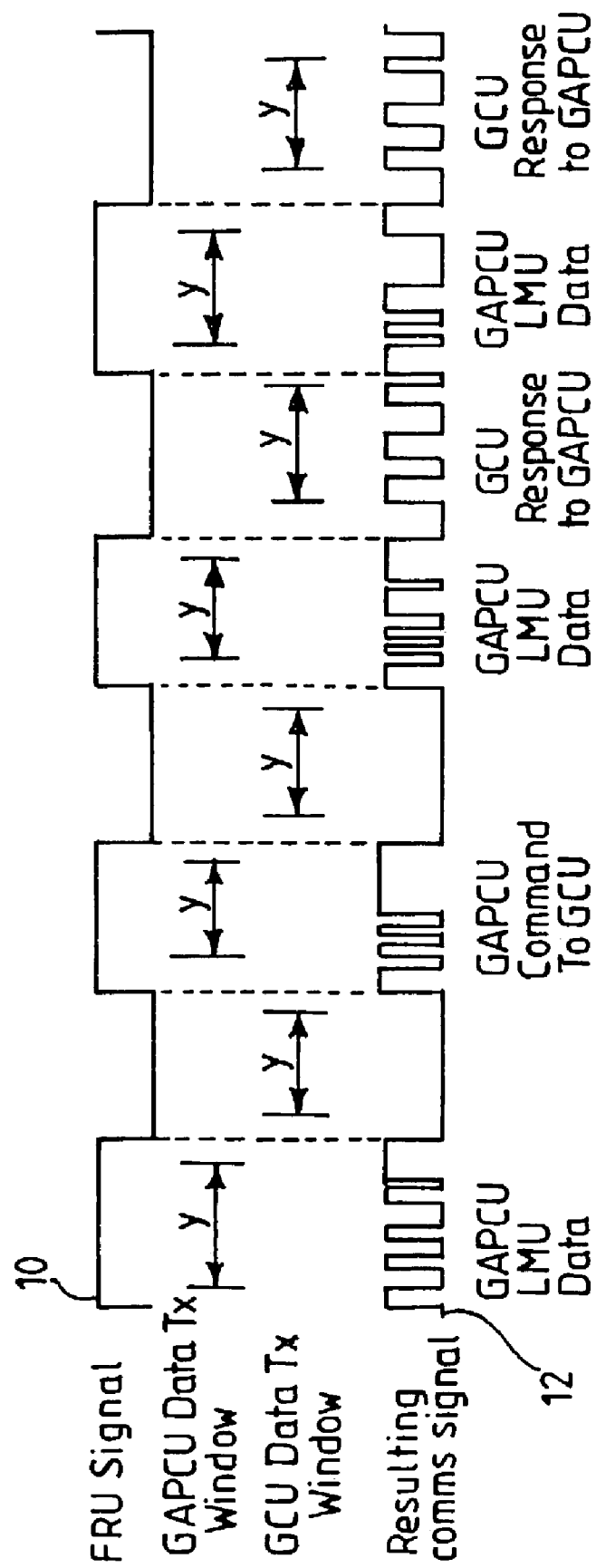
FIG. 4 shows the resulting communication signal for the power supply unit of FIG. 1 in accordance with an embodiment of the present invention.

In a further embodiment of the present invention, the time required to detect a rising edge or falling edge of the frequency reference signal may be further reduced by suitable filtering such that data transmission of the command message may be transmitted during both the high period of the frequency reference signal and the low period of the frequency reference signal. In this way it is possible to arrange for a first command message signal to be transmitted within the high period of the frequency reference signal and a second, separate command signal to be transmitted during the low periods of the frequency reference signal. This is indicated in FIG. 4, where the frequency reference signal 10 is shown as a regular square wave, there being a data transmission window Y available during both the high periods of the frequency reference signal and the low periods of the frequency reference signal. In FIG. 4 the data transmission window during the high periods of the frequency reference signal are labelled as GAPCU unit signals, as issued by the ground power unit 4 in the power control unit 2. The data transmission windows in the low periods of the frequency reference signal 10 are labelled as the generator control unit data transmission windows for the transmission of command signals from the generator control units 5 of the aircraft by supply system 1 to the power control system unit 2. The resulting combined signal 12 is also illustrated on FIG. 4.

It will be appreciated by those skilled in the art that by using simple time multiplexing techniques almost any number of higher rate signals may be combined with the frequency reference signals. The present invention enables the number of signal lines within an aircraft to be reduced, thereby reducing the weight of the wiring harness and/or enabling increasingly sophisticated control systems to be retrofitted to aircraft.

It will also be appreciated that the lower frequency signal, in the above embodiments the frequency reference signal, does not have to be a periodic signal. As long as a minimum time period is defined in which any change in the signal level of the original signal may be detected then in fact the lower frequency signal may equally be a data signal.

Although the above embodiments have been described in relation to no break power transfer between a power supply unit on an aircraft and an auxiliary power supply unit, further embodiments encompassing the overall concept of combining a first signal having a first frequency with one or more second signals having higher frequencies to produce a combined signal that may be transmitted down a single transmission line are equally applicable and are intended to be covered by the present invention.

The invention claimed is:

1. A method of transmitting two signals over a single transmission path for synchronizing generators within an aircraft electrical system, the method comprising the steps of transmitting a first of the two signals and modulating the first signal with a second of the two signals, the second signal having a higher frequency content than the first signal and in which the second signal comprises a digital word, and the digital word is sent in a period contained within a first or a second period of the first signal.

2. A method as claimed in claim 1, wherein the first signal comprises first periods of a first signal level separated by second periods of a second signal level.

3. A method as claimed in claim 2, wherein the second signal comprises a plurality of pulses each pulse having a duration less than the first period of the first signal, and wherein the second signal is transmitted within the first period of the first pulse.

4. A method as claimed in claim 2, in which the commencement of the first period is marked by a signal transition, and a guard period in which the second signal is not transmitted is provided immediately in advance of the signal transition.

5. A method as claimed in claim 2, in which the commencement of the first period is marked by a signal transition, and a guard period in which the second signal is not transmitted is provided immediately following the signal transition.

6. A method as claimed in claim 2, in which digital data is transmitted during the second period.

7. A method as claimed in claim 1, in which the first signal is a synchronisation signal.

8. A method as claimed in claim 1, wherein the second signal has a shorter inter-pulse period than the first signal.

9. A method of synchronising generators within an avionics system having a plurality of generator controllers so as to perform no-break power transfer, the method comprising providing a reference signal for frequency and/or phase synchronisation, the reference signal being transmitted along a transmission path, and transmitting messages the between the generator controllers along the transmission path such that the generator controllers can co-operate to perform the no-break power transfer, the messages being sent during a mark or space period of the reference signal.

10. A generator control system comprising a plurality of generator controllers responsive to a signal path, wherein a first signal is transmitted on the signal path, and a second signal is transmitted on the signal path, the second signal modulating the first signal and having a higher frequency content than the first signal, where the first signal is a reference signal for synchronising a generator controller of the plurality and the second signal conveys commands or status data to the generator controller of the plurality.

11. A generator control system as claimed in claim 10, in which the first signal comprises a plurality of first periods of a first signal level separated by second periods of a second signal level.

12. A generator control system as claimed in claim 11, in which the second signal comprises a digital word, and the digital word is sent in a period contained within the first period of the first signal.

13. A generator control system as claimed in claim 12, wherein the commencement of the first period is marked by a signal transition of the first signal and a guard period is provided before and after the transition in which the second signal is not transmitted.

14. A generator control system as claimed in claim 13, in which the controllers synchronise with the first signal by identifying the signal transition surrounded by the guard period.

15. A generator control system as claimed in claim 11, in which data is transmitted as a digital word within the second period.

16. A control system as claimed in claim 10, wherein the second signal has a shorter inter-pulse period than the first signal.

17. A device comprising a controller for a generator, wherein the controller has a signal connection, wherein the controller is configured to obtain generator synchronization timing data from a timing reference signal on the signal connection, and wherein the controller is further configured to exchange with other generator controllers command signals modulated onto the timing reference signal and having a shorter inter-pulse period than the timing reference signal.

18. A method of transmitting two signals over a single transmission path, for synchronizing generators within an aircraft electrical system, the method comprising: providing a first signal comprising a series of first pulses, each of the first pulses having a first pulse duration, and transmitting said first signal over the transmission path; and providing a second signal comprising a series of second pulses, each of the second pulses having a duration, each of the second pulse durations being less than the first pulse duration, and transmitting said second signal over the transmission path, whereby said second signal is transmitted within said first pulse duration.

\* \* \* \* \*